(12) United States Patent
Sakanishi et al.

(10) Patent No.: US 10,514,505 B2
(45) Date of Patent: Dec. 24, 2019

(54) COATING REMOVAL BLADE, REMOVAL BLADE UNIT AND OPTICAL FIBER COATING REMOVAL APPARATUS

(71) Applicant: FUJIKURA LTD., Tokyo (JP)

(72) Inventors: Sanga Sakanishi, Sakura (JP); Noriyuki Kawanishi, Sakura (JP)

(73) Assignee: Fujikura Ltd., Tokyo (JP)

( * ) Notice: Subject to any disclaimer, the term of this patent is extended or adjusted under 35 U.S.C. 154(b) by 22 days.

(21) Appl. No.: 15/543,767

(22) PCT Filed: Mar. 6, 2017

(86) PCT No.: PCT/JP2017/008732
§ 371 (c)(1),
(2) Date: Jul. 14, 2017

(87) PCT Pub. No.: WO2018/150596
PCT Pub. Date: Aug. 23, 2018

(65) Prior Publication Data
US 2018/0329141 A1     Nov. 15, 2018

(30) Foreign Application Priority Data
Feb. 20, 2017   (JP) .................................. 2017-028573

(51) Int. Cl.
*G02B 6/245*     (2006.01)
*B26D 3/28*      (2006.01)
(Continued)

(52) U.S. Cl.
CPC ............... *G02B 6/245* (2013.01); *B26D 3/28* (2013.01); *B26D 7/02* (2013.01); *B26D 7/10* (2013.01); *B26D 2007/013* (2013.01)

(58) Field of Classification Search
CPC .... G02B 6/245; H02G 1/1209; H02G 1/1241; H02G 1/1275; B26D 3/28; B26D 7/02; B26D 7/10; B26D 2007/013
See application file for complete search history.

(56) References Cited

U.S. PATENT DOCUMENTS

| | | | |
|---|---|---|---|
| 4,969,703 A | 11/1990 | Fyfe et al. | |
| 5,481,638 A * | 1/1996 | Roll ........................ | G02B 6/245 30/279.2 |

(Continued)

FOREIGN PATENT DOCUMENTS

| | | |
|---|---|---|
| CN | 1673789 A | 9/2005 |
| CN | 202093202 U | 12/2011 |

(Continued)

OTHER PUBLICATIONS

Office Action issued in corresponding Korean Paten Application No. 10-2017-7016323 dated Oct. 16, 2018 (4 pages).

(Continued)

*Primary Examiner* — Robert J Scruggs
(74) *Attorney, Agent, or Firm* — Osha Liang LLP (57) ABSTRACT

A coating removal blade used in an optical fiber coating removal apparatus that removes a coating material of an optical fiber includes a blade tip that is pressed against the coating material from a radial direction of an optical fiber bare wire of the optical fiber, and a pressing surface against which the coating material to be pulled out from the optical fiber is pressed in a longitudinal direction of the optical fiber. The pressing surface includes an inclined surface that is inclined at a constant angle to extend in a direction opposite to a pulling-out direction of the optical fiber as a distance from the blade tip in the radial direction of the optical fiber bare wire increases, and an inclination angle of the inclined surface with respect to the pulling-out direction of the (Continued)

optical fiber is larger than 0° and equal to or smaller than 60°.

8 Claims, 6 Drawing Sheets

(51) Int. Cl.
  *B26D 7/02* (2006.01)
  *B26D 7/10* (2006.01)
  *B26D 7/01* (2006.01)

(56) References Cited

U.S. PATENT DOCUMENTS

| | | | | |
|---|---|---|---|---|
| 5,582,078 | A * | 12/1996 | Talley | H02G 1/1265 81/9.42 |
| 6,273,990 | B1 * | 8/2001 | Bookbinder | B82Y 30/00 156/714 |
| 8,676,018 | B2 * | 3/2014 | Barnes | G02B 6/245 30/90.1 |
| 8,844,602 | B2 * | 9/2014 | Saito | G02B 6/245 156/701 |
| 2002/0186947 | A1 | 12/2002 | Abe et al. | |
| 2004/0055161 | A1 * | 3/2004 | Chiang | G02B 6/245 30/90.4 |
| 2004/0181945 | A1 * | 9/2004 | Shiraishi | G02B 6/245 30/90.1 |
| 2006/0039658 | A1 | 2/2006 | Furuyama et al. | |
| 2011/0220294 | A1 | 9/2011 | Saito et al. | |
| 2014/0245875 | A1 * | 9/2014 | Harrison | G02B 6/245 83/861 |

FOREIGN PATENT DOCUMENTS

| | | |
|---|---|---|
| CN | 102460250 A | 5/2012 |
| CN | 104238015 A | 12/2014 |
| CN | 207148359 U | 3/2018 |
| EP | 2405289 A1 | 1/2012 |
| JP | 2001/330736 A | 11/2001 |
| JP | 2002-341148 A | 11/2002 |
| JP | 2003/337227 A | 11/2003 |
| JP | 2008/167813 A | 7/2008 |
| JP | 2012/145737 A | 8/2012 |
| WO | 2010/100912 A1 | 9/2010 |

OTHER PUBLICATIONS

Notice of Allowance issued in corresponding Japanese Application No. 2017-028573 dated Aug. 1, 2017 (3 pages).
Japanese Office Action issued in corresponding application No. 2017-028573 dated May 16, 2017 (4 pages).
Extended European Search Report issued in corresponding European Patent Application No. 17732280.7 dated Jan. 17, 2019 (9 pages).
Notice of Allowance issued in corresponding Korean Patent Application 10-2017-7016323 dated Apr. 29, 2019 (2 pages).
Office Action issued in corresponding Chinese Patent Application No. 201710276726.1, dated Aug. 2, 2019 (8 pages).

* cited by examiner

COATING REMOVAL BLADE, REMOVAL BLADE UNIT AND OPTICAL FIBER COATING REMOVAL APPARATUS

TECHNICAL FIELD

The present invention relates to a coating removal blade, a removal blade unit and an optical fiber coating removal apparatus.

This application is a national stage application of PCT Application No. PCT/JP2017/008732, filed on Mar. 6, 2017, which claims priority to Japanese Patent Application No. 2017-028573, filed on Feb. 20, 2017. The contents of the priority applications are incorporated by reference in their entirety.

BACKGROUND

An optical fiber coating removal apparatus has been known which removes a coating material of a terminal portion of each optical fiber in order to connect the optical fibers (coated optical fibers) each having an optical fiber bare wire and the coating material coating the optical fiber bare wire (for example, refer to Patent Document 1).

In the optical fiber coating removal apparatus, the coating material at the terminal portion of the optical fiber is removed by a pair of coating removal blades provided in the optical fiber coating removal apparatus as follows. First, the optical fiber is sandwiched between a pair of upper and lower coating removal blades from a radial direction of the optical fiber bare wire within a range where the pair of coating removal blades bites into the coating material but does not reach the optical fiber bare wire. Thereafter, a portion of the optical fiber extending from the pair of coating removal blades to one side in a longitudinal direction of the optical fiber is moved in a direction of pulling apart (pulling-out direction) with respect to a portion of the optical fiber extending from the pair of coating removal blades to another side in the longitudinal direction of the optical fiber (terminal portion) and then, a portion of the coating material into which the coating removal blades bite is tore off. As a result, the coating material can be pulled out from the terminal portion of the optical fiber and removed.

Patent Document 1 discloses an optical fiber coating removal apparatus in which a pair of guides for supporting an optical fiber so as to sandwich the optical fiber from a radial direction of an optical fiber bare wire is disposed adjacent to a pair of coating removal blades. An interval between the pair of guides is fixed so as to be equivalent to the thickness of the optical fiber (for example, the diameter of a single core optical fiber or the thickness of a tape optical fiber). By supporting the optical fiber with the pair of guides, the optical fiber bare wire is prevented from coming into contact with the coating removal blade and being damaged therewith when the coating material is pulled out from the terminal portion of the optical fiber.

[Patent Document 1] PCT International Publication No. WO2010/100912

In recent years, there are various types of optical fibers having different thicknesses of the optical fiber (for example, the thickness of the coating material covering the optical fiber bare wire). However, the above conventional optical fiber coating removal apparatus has poor workability and is not preferable, since an operator needs to exchange the pair of guides according to the thickness of the optical fiber. Although there is a method of making a mechanism capable of precisely adjusting the interval between the pair of guides, an expensive and complicated structure is required for such a mechanism.

SUMMARY

One or more embodiments of the present invention provide a coating removal blade, a removal blade unit, and an optical fiber coating removal apparatus that can inexpensively support and easily handle various types of optical fibers.

One or more embodiments of the present invention provide a coating removal blade used in an optical fiber coating removal apparatus configured to remove a coating material of an optical fiber, including a blade tip that is pressed against the coating material from a radial direction of an optical fiber bare wire of the optical fiber, and a pressing surface against which the coating material to be pulled out from the optical fiber is pressed in a longitudinal direction of the optical fiber, in which the pressing surface includes an inclined surface inclined at a constant angle so as to extend in a direction opposite to a pulling-out direction of the optical fiber as a distance from the blade tip in the radial direction of the optical fiber bare wire increases, and an inclination angle of the inclined surface with respect to the pulling-out direction of the optical fiber is larger than 0° and equal to or smaller than 60°.

One or more embodiments of the present invention provide a coating removal blade used in an optical fiber coating removal apparatus configured to remove a coating material of an optical fiber, including a blade tip that is pressed against the coating material from a radial direction of an optical fiber bare wire of the optical fiber, and a pressing surface against which the coating material to be pulled out from the optical fiber is pressed in a longitudinal direction of the optical fiber, in which the pressing surface includes an inclined surface inclined so as to extend in a direction opposite to a pulling-out direction of the optical fiber as a distance from the blade tip in the radial direction of the optical fiber bare wire increases, and the inclined surface is formed in a curved surface shape in which an inclination angle of the inclined surface with respect to the pulling-out direction of the optical fiber becomes smaller as a distance from the blade tip increases.

One or more embodiments of the present invention provide the coating removal blade in which the pressing surface includes a hook surface formed between the inclined surface and the blade tip, and the hook surface may be orthogonal to the pulling-out direction of the optical fiber or may be inclined so as to extend in the direction opposite to the pulling-out direction of the optical fiber as a distance to the blade tip from the inclined surface in the radial direction of the optical fiber bare wire decreases.

One or more embodiments of the present invention provide the coating removal blade further including a first blade-divided body including the inclined surface, and a second blade-divided body including the hook surface and the blade tip, in which the first blade-divided body and the second blade-divided body may be sequentially arranged in the pulling-out direction.

One or more embodiments of the present invention provide the coating removal blade in which a recess portion recessed in the pulling-out direction may be formed between the inclined surface and the hook surface of the pressing surface.

One or more embodiments of the present invention provide the coating removal blade in which the inclined surface is formed on an inner surface of a rotating body having the pulling-out direction as an axis, and an inner diameter of the inner surface of the rotating body may increase toward the direction opposite to the pulling-out direction from the blade tip.

One or more embodiments of the present invention provide a removal blade unit including a pair of the coating removal blades in which the inclined surfaces of the pair of coating removal blades face each other in an arrangement direction of the pair of coating removal blades while the optical fiber is sandwiched between the pair of coating removal blades from the radial direction of the optical fiber bare wire and an interval between the inclined surfaces of the pair of coating removal blades gradually decreases toward the pulling-out direction of the optical fiber.

One or more embodiments of the present invention provide the removal blade unit in which the inclination angles of the inclined surfaces of the pair of coating removal blades may be equal to each other.

One or more embodiments of the present invention provide an optical fiber coating removal apparatus including the removal blade unit according to one or more embodiments.

One or more embodiments of the present invention provide an optical fiber coating removal apparatus including the coating removal blade according to one or more embodiments.

According one or more embodiments of the present invention described above, it is possible to prevent the optical fiber bare wire from coming into contact with the blade tip of the coating removal blade when the optical fiber is pulled out from the coating material by using only the pair of coating removal blades. In addition, it is possible to deal with coating removal for various types of optical fibers having various thicknesses by setting the inclined surfaces of the pair of coating removal blades to face each other in the arrangement direction of the pair of coating removal blades. Therefore, it is possible to inexpensively deal with coating removal for various types of optical fibers having different thicknesses, while an operator can easily handle the optical fiber coating removal apparatus.

DETAILED DESCRIPTION

Hereinafter, one or more embodiments of an optical fiber coating removal apparatus will be described with reference to FIGS. 1 to 4.

The optical fiber coating removal apparatus of the first example of one or more embodiments removes a coating material at a terminal portion of an optical fiber (coated optical fiber). The optical fiber handled in the optical fiber coating removal apparatus may be a single core optical fiber or a tape optical fiber.

Figure 1:
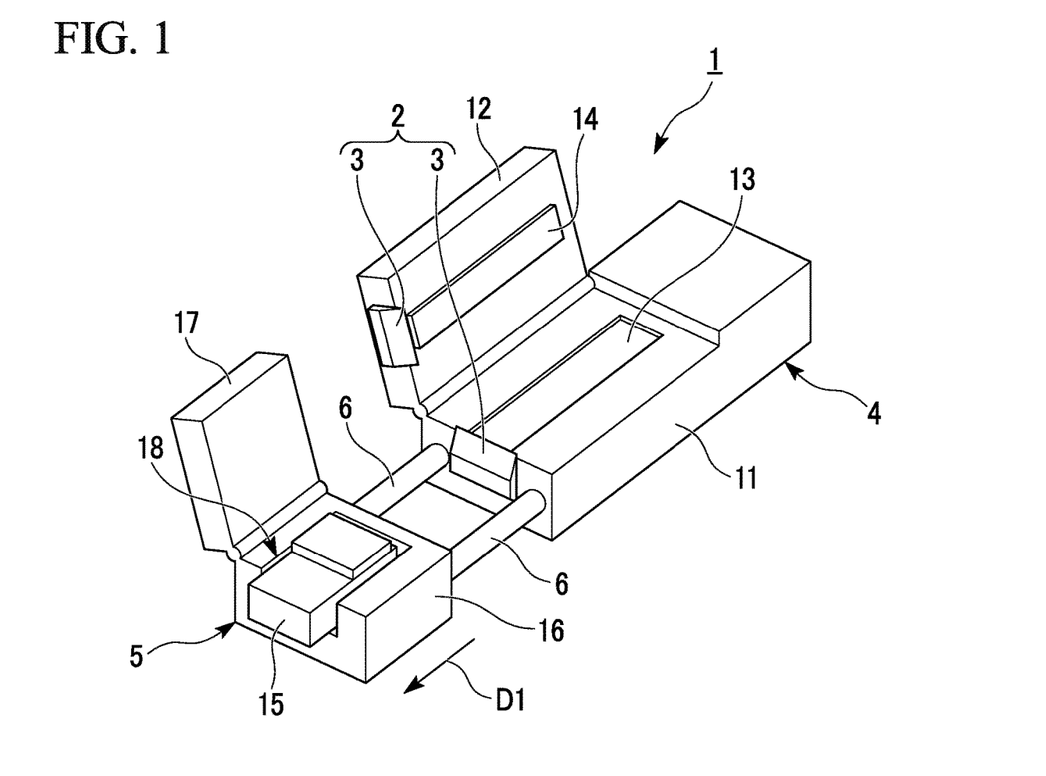
FIG. 1 is a perspective view showing an example of an optical fiber coating removal apparatus according to one or more embodiments of the present invention.
Figure 2:
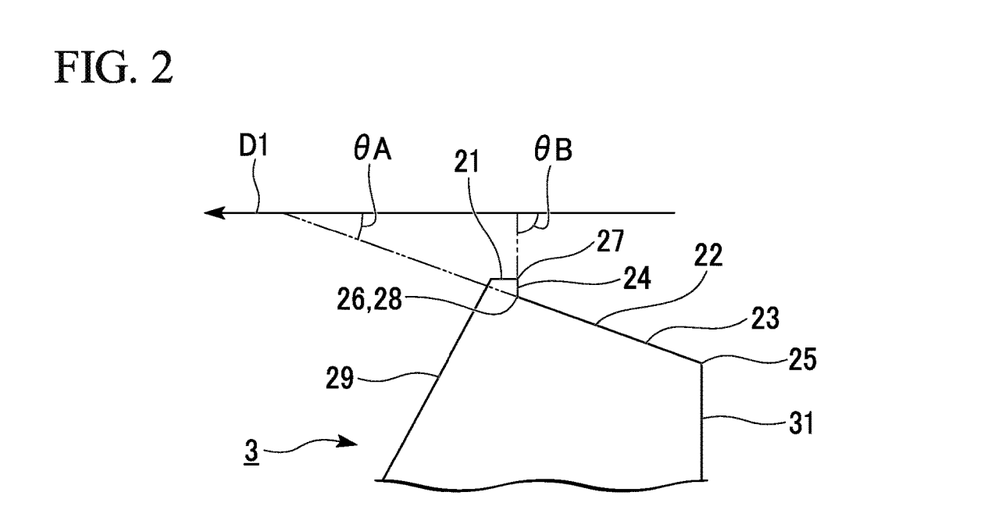
FIG. 2 is a side view showing a coating removal blade according to one or more embodiments of the present invention.
Figure 3:
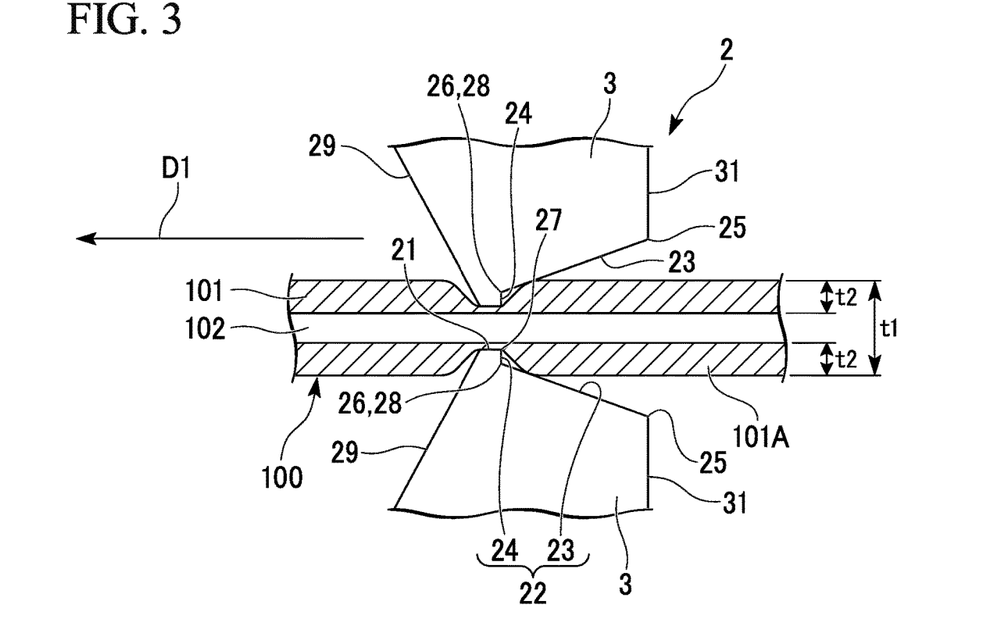
FIG. 3 is a view showing a state in which an optical fiber is sandwiched between a pair of coating removal blades in order to remove a coating material of the optical fiber using the coating removal blade of FIG. 2.

As shown in FIGS. 1 to 3, the optical fiber coating removal apparatus 1 (hereinafter referred to as a coating removal apparatus 1) includes a removal blade unit 2 configured to remove a coating material 101 of an optical fiber 100. The removal blade unit 2 includes a pair of coating removal blades 3 and 3. When removing the coating material 101, the pair of coating removal blades 3 and 3 sandwiches the optical fiber 100 from a radial direction of an optical fiber bare wire 102 (the vertical direction in FIG. 3).

In addition, the coating removal apparatus 1 is provided with a pulling-out mechanism to pull out the other portion of the optical fiber 100 relative to a coating material 101A at the terminal portion while the optical fiber 100 is sandwiched between the pair of coating removal blades 3 and 3.

Hereinafter, the overall configuration of the coating removal apparatus 1 of one or more embodiments will be specifically described.

The coating removal apparatus 1 of one or more embodiments includes, in addition to the pair of coating removal blades 3 and 3, two clamp units 4 and 5 and a slide shaft 6.

One of the two clamp units 4 and 5 is a first clamp unit 4 for sandwiching the terminal portion of the optical fiber 100. The first clamp unit 4 includes a base 11 and a lid 12. The base 11 and the lid 12 are coupled to each other such that the base 11 and the lid 12 can be opened and closed. By closing the lid 12 on the base 11, the terminal portion of the optical fiber 100 can be sandwiched and held in the first clamp unit 4. The terminal portion of the optical fiber 100 is brought into contact with facing surfaces 13 and 14 of the base 11 and the lid 12, respectively, facing each other while the terminal portion of the optical fiber 100 is sandwiched by the first clamp unit 4. Therefore, at least one of the facing surfaces 13 and 14 of the base 11 and the lid 12 may be made of a material having a high coefficient of friction with the terminal portion of the optical fiber 100 (coating material 101A), such as rubber.

The pair of coating removal blades 3 and 3 is attached individually to the base 11 and the lid 12 of the first clamp unit 4. The pair of coating removal blades 3 and 3 is disposed at an end portion of the first clamp unit 4 facing a second clamp unit 5 described later.

The other of the two clamp units 4 and 5 is the second clamp unit 5 for sandwiching the other portion of the optical fiber 100 (a portion adjacent to the terminal portion). The second clamp unit 5 includes a fiber holder 15, a holder base 16, and a holder lid 17. The fiber holder 15 holds the other portion of the optical fiber 100 such that the other portion is clamped and is detachably provided to the holder base 16. The holder base 16 is formed with a housing recess 18 that houses the fiber holder 15. The housing recess 18 is formed so as not to open at an end portion of the second clamp unit 5 facing the first clamp unit 4. The holder lid 17 is coupled to the holder base 16 such that the holder lid 17 can be opened and closed.

The fiber holder 15 holding the other portion of the optical fiber 100 is housed in the housing recess 18 of the holder base 16 and then, the holder lid 17 is closed on the holder base 16 such that the fiber holder 15 can be held within the housing recess 18. With this, the other portion of the optical fiber 100 can be held in the second clamp unit 5.

The slide shaft 6 is a guide for moving the two clamp units 4 and 5 only in a direction in which the above-mentioned two clamp units 4 and 5 are moved toward and away from each other in a longitudinal direction of the optical fiber 100.

These two clamp units 4 and 5 and the slide shaft 6 constitute the aforementioned pulling-out mechanism.

In the coating removal apparatus 1 of one or more embodiments, for example, a heater (not shown) for heating the coating material 101A at the terminal portion of the optical fiber 100 may be provided on, for example, one or both of the base 11 and the lid 12 of the first clamp unit 4.

In the coating removal apparatus 1 described above, the coating material 101A of the optical fiber 100 can be removed as follows.

First, the terminal portion of the optical fiber 100 is held by the first clamp unit 4, while the other portion of the optical fiber 100 is held by the second clamp unit 5. By holding the terminal portion of the optical fiber 100 in the first clamp unit 4, it is possible to sandwich the optical fiber 100 from the radial direction of the optical fiber bare wire 102 with the pair of coating removal blades 3 and 3 as shown in FIG. 3.

Figure 4:
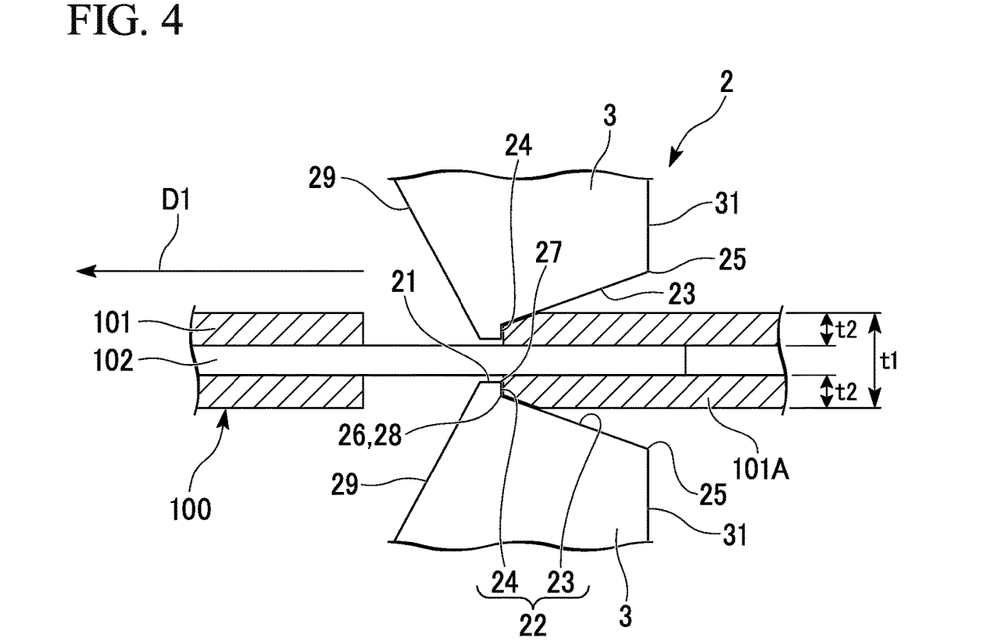
FIG. 4 is a view showing a process of removing a coating material of an optical fiber using the coating removal blade of FIG. 2.

Thereafter, as shown in FIG. 4, by moving the second clamp unit 5 in a direction away from the first clamp unit 4 (a pulling-out direction D1 of the optical fiber 100), the portion of the coating material 101 sandwiched between the pair of coating removal blades 3 and 3 is cut off. With this, the optical fiber 100 can be pulled out relative to the coating material 101A held by the first clamp unit 4.

In the case where the coating removal apparatus 1 includes a heater, by heating the coating material 101A at the terminal portion with the heater while the terminal portion of the optical fiber 100 is held in the first clamp unit 4, an adhesion force between the coating material 101A and the optical fiber bare wire 102 can be reduced. Accordingly, when the second clamp unit 5 is moved with respect to the first clamp unit 4, the optical fiber 100 can be pulled out from the coating material 101A with ease.

Next, the shape of the coating removal blade 3 according to one or more embodiments will be described.

As shown in FIGS. 2 to 4, the coating removal blade 3 has a blade tip 21 and a pressing surface 22. The blade tip 21 is a portion that is pressed against the coating material 101 from the radial direction of the optical fiber bare wire 102 when the optical fiber 100 is sandwiched between the pair of coating removal blades 3 and 3.

The pressing surface 22 is a surface against which the coating material 101A to be pulled out from the optical fiber 100 is pressed in the longitudinal direction of the optical fiber 100 when the optical fiber 100 is pulled out relative to the coating material 101A. In other words, the pressing surface 22 is a surface against which the coating material 101A to be removed from the optical fiber 100 is pressed when the optical fiber 100 is pulled out relative to the coating material 101A at the terminal portion in a state where the optical fiber 100 is sandwiched between the pair of coating removal blades 3 and 3. The pressing surface 22 is a surface facing a direction opposite to the pulling-out direction D1 of the optical fiber 100 (the right direction in FIG. 2).

The pressing surface 22 includes an inclined surface 23. The inclined surface 23 is a surface inclined so as to extend in a direction opposite to the pulling-out direction D1 of the optical fiber 100 as the distance from the blade tip 21 of the coating removal blade 3 in the radial direction of the optical fiber bare wire 102 (the downward direction in FIG. 2) increases.

An inclination angle θA of the inclined surface 23 with respect to the pulling-out direction D1 of the optical fiber 100 is larger than 0° and equal to or smaller than 60°. Alternatively, the inclination angle θA of the inclined surface 23 may be, for example, 45° or smaller, or may be 30° or smaller. Alternatively, the inclination angle θA of the inclined surface 23 may be, for example, 20° or smaller.

The inclined surface 23 of one or more embodiments is inclined at a constant angle at which the inclination angle θA does not change in an inclined direction thereof. That is, the inclined surface 23 of one or more embodiments is formed linearly when viewed from the direction shown in FIGS. 2 to 4.

In the removal blade unit 2 including the pair of coating removal blades 3 and 3, the inclined surfaces 23 and 23 of the pair of coating removal blades 3 and 3 face each other in the arrangement direction of the pair of coating removal blades 3 and 3 (the vertical direction in FIG. 3) while the optical fiber 100 is sandwiched between the pair of coating removal blades 3 and 3. In addition, an interval between this pair of inclined surfaces 23 and 23 gradually decreases toward the pulling-out direction D1 of the optical fiber 100. The inclination angles θA of the pair of inclined surfaces 23 and 23 may be equal to each other but may also be slightly different, for example.

In the coating removal blade 3 including the inclined surface 23, the position of a first end 25 of the inclined surface 23 located furthest from the blade tip 21 in the radial direction of the optical fiber bare wire 102 (the vertical direction in FIG. 2) with respect to the blade tip 21 can be arbitrary.

The position of the first end 25 of the inclined surface 23 with respect to the blade tip 21 may be set such that, for example, in a state where the optical fiber 100 is sandwiched between the pair of coating removal blades 3 and 3, a distance between the first ends 25 and 25 of the inclined surfaces 23 and 23 of the pair of coating removal blades 3 and 3 in the arrangement direction of the pair of coating removal blades 3 and 3 is larger than a thickness t1 of the optical fiber 100 (the diameter of the single core optical fiber or the thickness of the tape optical fiber). In this case, when the optical fiber 100 is pulled out relative to the coating material 101A, the coating material 101A to be pulled out from the optical fiber 100 can be prevented from being pushed against a surface other than the pressing surface 22, for example, a vertical surface 31 connected to the first end 25 of the inclined surface 23 (a surface extending in the radial direction of the optical fiber bare wire 102).

A distance from the blade tip 21 to the first end 25 of the inclined surface 23 in the radial direction of the optical fiber bare wire 102 (the vertical direction in FIG. 3) is larger than a thickness t2 of the coating material 101 of the optical fiber 100 of a type having, for example, the largest thickness of the coating material 101.

The pressing surface 22 of one or more embodiments also includes the hook surface 24 in addition to the inclined surface 23 described above. The hook surface 24 is formed between the inclined surface 23 and the blade tip 21.

For example, the hook surface 24 may be inclined so as to extend in the direction opposite to the pulling-out direction D1 of the optical fiber 100 as a distance from the blade tip 21 of the coating removal blade 3 in the radial direction of the optical fiber bare wire 102 (the downward direction in FIG. 2) increases. That is, an inclination angle θB of the hook surface 24 with respect to the pulling-out direction D1 of the optical fiber 100 may be, for example, larger than 90°.

The hook surface 24 of one or more embodiments is orthogonal to the pulling-out direction D1 of the optical fiber 100. The inclination angle θB of the hook surface 24 orthogonal to the pulling-out direction D1 may be 90° or an angle slightly deviated from 90° (desirably in the range of 80° to 120°.

In one or more embodiments, the hook surface 24 extends from the blade tip 21 to the inclined surface 23. Specifically, a first end 27 of the hook surface 24 is directly connected to the blade tip 21. A second end 28 of the hook surface 24 is directly connected to a second end 26 of the inclined surface 23 located closest to the blade tip 21 in the radial direction of the optical fiber bare wire 102.

The hook surface 24 functions as a surface against which a portion of the coating material 101A to be pulled out from the optical fiber 100 on a side close to the optical fiber bare wire 102 in the radial direction of the optical fiber bare wire 102 (an inner portion of the coating material 101A) is pressed when the optical fiber 100 is pulled out relative to the coating material 101A.

Therefore, the dimension of the hook surface 24 in the radial direction of the optical fiber bare wire 102 (a distance from the first end 27 to the second end 28 of the hook surface 24 in the radial direction of the optical fiber bare wire 102 (the vertical direction in FIG. 2)) is smaller than at least the thickness t2 of the coating material 101 covering the optical fiber bare wire 102. In addition, the dimension of the hook surface 24 in the radial direction of the optical fiber bare wire 102 is set such that the second end 28 of the hook surface 24 is located inside the coating material 101, compared to an outer surface of the coating material 101 while the blade tip 21 bites into the coating material 101 as shown in FIG. 3.

For example, when the thickness t1 of the optical fiber 100 (the diameter of the single core optical fiber or the thickness of the tape optical fiber) of a type having the smallest thickness is 200 μm, the dimension of the hook surface 24 in the radial direction of the optical fiber bare wire 102 is set to be smaller than, for example, 100 μm.

The blade tip 21 of the coating removal blade 3 may be, for example, pointed but, in one or more embodiments, is formed in a flat shape extending in the pulling-out direction D1 of the optical fiber 100. The length of the blade tip 21 in the pulling-out direction D1 of the optical fiber 100 is set to such a degree that the blade tip 21 can bite into the coating material 101 when the optical fiber 100 is sandwiched between the pair of coating removal blades 3 and 3.

Since the blade tip 21 is formed flat, it is possible to ensure the strength of a tip portion of the coating removal blade 3 including the blade tip 21 and the hook surface 24 and to suppress chipping of the tip portion. Additionally, compared with a case where the blade tip 21 is pointed, it is possible to suppress that the blade tip 21 excessively bites into the coating material 101 until reaching the optical fiber bare wire 102. That is, it is possible to prevent the optical fiber bare wire 102 from being damaged by the coating removal blade 3.

Meanwhile, a surface 29 (opposite surface 29) of the coating removal blade 3 connected to a side opposite to the above-described pressing surface 22 with respect to the blade tip 21 may be, for example, orthogonal to the pulling-out direction D1 of the optical fiber 100. In one or more embodiments, however, the surface 29 is inclined in a direction gradually away from the blade tip 21 in the radial direction of the optical fiber bare wire 102 toward the pulling-out direction D1 of the optical fiber 100. Since the opposite surface 29 is inclined, the strength of the tip portion of the coating removal blade 3 can be further ensured and chipping of the tip portion can be further suitably suppressed.

In addition, the coating removal blade 3 in one or more embodiments is a flat blade extending in one direction orthogonal to the pulling-out direction D1 of the optical fiber 100 (a direction orthogonal to the paper surface in FIGS. 2 to 4). The inclined surface 23, the hook surface 24, the blade tip 21, and the opposite surface 29 of the coating removal blade 3 are formed on a surface extending in the above-mentioned one direction and are flat.

Next, the action of the coating removal blade 3 of one or more embodiments configured as described above will be described.

The coating removal blade 3 of one or more embodiments has the inclined surface 23. Therefore, as shown in FIG. 3, while the optical fiber 100 is sandwiched between the pair of coating removal blades 3 and 3, the inclined surfaces 23 and 23 of the pair of coating removal blades 3 and 3 face each other in the arrangement direction of the pair of coating removal blades 3 and 3. In addition, the interval between the pair of inclined surfaces 23 and 23 gradually decreases toward the pulling-out direction D1 of the optical fiber 100. Therefore, as shown in FIG. 4, when the optical fiber 100 is moved in the pulling-out direction D1, the coating material 101A located between the pair of inclined surfaces 23 and 23 is pressed in a direction of approaching the center of the optical fiber bare wire 102 in the arrangement direction of the pair of coating removal blades 3 and 3. At this time, the coating material 101A between the pair of inclined surfaces 23 and 23 is compressively deformed. The fact that the coating material 101A between the pair of inclined surfaces 23 and 23 is pressed toward the center of the optical fiber bare wire 102 makes it possible to prevent the optical fiber bare wire 102 from approaching one of the blade tips 21 of the coating removal blades 3. That is, it is possible to prevent the optical fiber bare wire 102 from coming into contact with the blade tip 21 of the coating removal blade 3.

Meanwhile, the coating removal blade 3 of one or more embodiments has the hook surface 24. Therefore, as shown in FIG. 3, the hook surface 24 of each coating removal blade 3 is positioned so as to overlap with the coating material 101A between the pair of inclined surfaces 23 and 23 in the pulling-out direction D1 of the optical fiber 100 while the optical fiber 100 is sandwiched between the pair of coating removal blades 3 and 3 and the blade tip 21 bites into the coating material 101. Here, the hook surface 24 is orthogonal to the pulling-out direction D1 of the optical fiber 100. Therefore, as shown in FIG. 4, when the optical fiber 100 is moved in the pulling-out direction D1, the coating material 101A between the pair of inclined surfaces 23 and 23 is pressed against the hook surface 24. With this, it is possible to prevent the coating material 101A compressed by the pair of inclined surfaces 23 and 23 from passing through between the pair of coating removal blades 3 and 3.

Even when the hook surface 24 is, for example, not orthogonal but inclined as described above, the coating material 101A compressed by the pair of inclined surfaces 23 and 23 can be similarly prevented from passing through between the pair of coating removal blades 3 and 3.

As described thus far, according to the coating removal blade 3 of one or more embodiments and the removal blade unit 2 and the coating removal apparatus 1 including the coating removal blade 3, the pressing surface 22 of the coating removal blade 3 includes the inclined surface 23. Therefore, when the optical fiber 100 is pulled out from the coating material 101A at the terminal portion using only the pair of coating removal blades 3 and 3 without providing a guide as in the past, it is possible to prevent the optical fiber bare wire 102 from coming into contact with the blade tip 21 of the coating removal blade 3. Additionally, since the inclined surfaces 23 and 23 of the pair of coating removal blades 3 and 3 face each other in the arrangement direction of the pair of coating removal blades 3 and 3, it is possible to deal with coating removal for various types of the optical fibers 100 having various thicknesses. Consequently, it is possible to inexpensively deal with coating removal for various types of the optical fibers 100 having different thicknesses, while an operator can easily handle the coating removal apparatus 1.

Furthermore, in a case where the inclination angles θA of the inclined surfaces 23 and 23 of the pair of coating removal blades 3 and 3 are equal to each other, the following effects are achieved in the removal blade unit 2 of one or more embodiments. When the optical fiber 100 is pulled out from the coating material 101A in a state where the optical fiber 100 is sandwiched between the pair of coating removal blades 3 and 3, a force received by the coating material 101A located between the pair of inclined surfaces 23 and 23 from the inclined surface 23 becomes equal between the pair of inclined surfaces 23 and 23. This makes it possible to more reliably prevent the optical fiber bare wire 102 from approaching one of the blade tips 21 of the coating removal blades 3 when the optical fiber 100 is pulled out from the coating material 101A. That is, it is possible to more reliably prevent the optical fiber bare wire 102 from coming into contact with the blade tip 21 of the coating removal blade 3.

Meanwhile, in the coating removal blade 3 of one or more embodiments, the inclination angle θA of the inclined surface 23 is larger than 0°. With this, when the optical fiber 100 is pulled out relative to the coating material 101A, the coating material 101A to be pulled out from the optical fiber 100 can be pressed against the inclined surface 23 in the pulling-out direction D1 of the optical fiber 100.

Besides, in the coating removal blade 3 of one or more embodiments, the inclination angle θA of the inclined surface 23 is equal to or smaller than 60°. This makes it possible to prevent an insufficient force of pressing the coating material 101A located between the pair of inclined surfaces 23 and 23 toward the optical fiber bare wire 102 when the optical fiber 100 is pulled out relative to the coating material 101A. Therefore, it is possible to suitably prevent the optical fiber bare wire 102 from approaching and contacting one of the blade tips 21 of the coating removal blades 3.

In addition, when the inclination angle θA of the inclined surface 23 is further reduced from 60° (for example, in the case of 45° or smaller, 30° or smaller, and 20° or smaller), a force of pressing the coating material 101 located between the pair of inclined surfaces 23 and 23 against the optical fiber bare wire 102 can be increased. Consequently, it is possible to more reliably prevent the optical fiber bare wire 102 from coming into contact with one of the blade tips 21 of the coating removal blades 3.

Additionally, in the coating removal blade 3 of one or more embodiments, the pressing surface 22 also includes the hook surface 24. Therefore, it is possible to prevent the coating material 101A compressed by the pair of inclined surfaces 23 and 23 from passing through between the pair of coating removal blades 3 and 3 when the optical fiber 100 is pulled out from the coating material 101A. That is, it is possible to prevent the coating material 101A to be removed, from remaining on the optical fiber bare wire 102 at the terminal portion.

Next, one or more embodiments of the optical fiber coating removal apparatus will be described with reference to FIGS. 5 and 6, focusing on differences from one or more embodiments described above. Note that the same reference numerals are attached to configurations common to one or more embodiments described above and the description thereof will be omitted.

Figure 5:
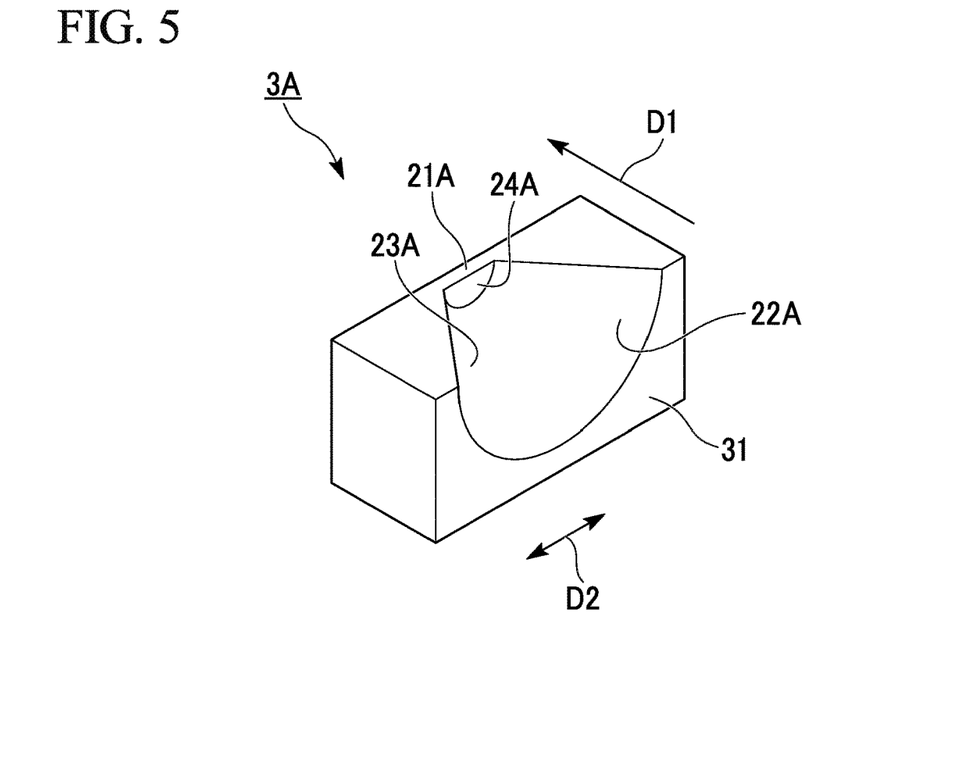
FIG. 5 is a perspective view showing a first example of a coating removal blade according to one or more embodiments of the present invention.
Figure 6:
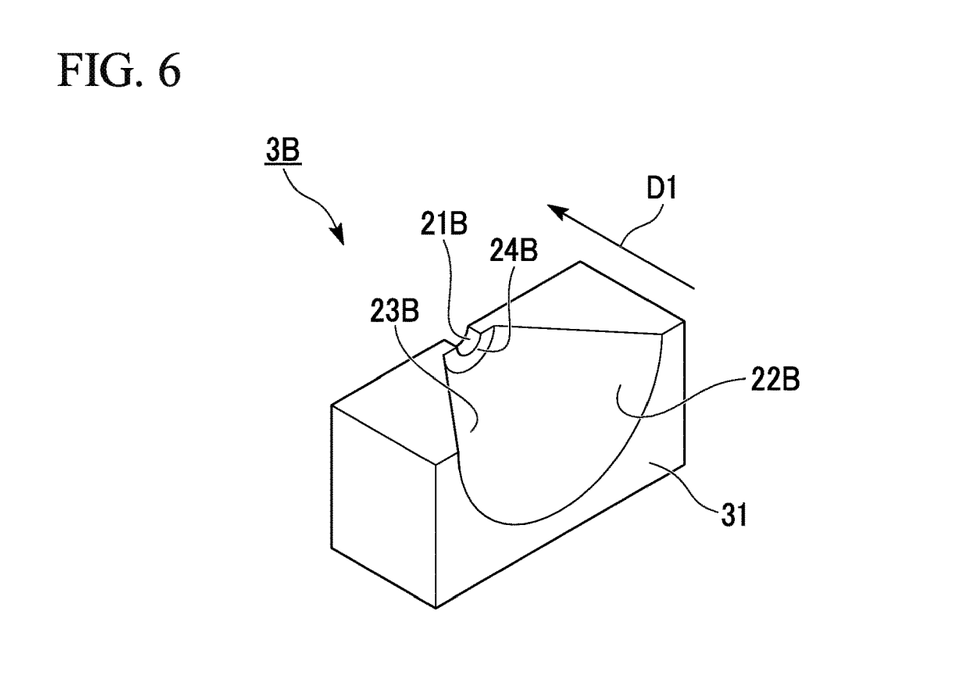
FIG. 6 is a perspective view showing a second example of the coating removal blade according to one or more embodiments of the present invention.

As shown in FIGS. 5 and 6, coating removal blades 3A and 3B of one or more embodiments have pressing surfaces 22A and 22B including inclined surfaces 23A and 23B and hook surfaces 24A and 24B, and blade tips 21A and 21B, respectively.

However, the inclined surfaces 23A and 23B according to one or more embodiments are formed on a conical inner surface (an inner surface of a rotating body) having the pulling-out direction D1 of an optical fiber 100 as an axis. The inner diameter of the conical inner surface becomes larger toward the direction opposite to the pulling-out direction D1 of the optical fiber 100 from the blade tips 21A and 21B.

The hook surfaces 24A and 24B according to one or more embodiments are formed on a fan-shaped surface having the pulling-out direction D1 of the optical fiber 100 as an axis, similarly to the inclined surfaces 23A and 23B.

In FIGS. 5 and 6, the inclined surfaces 23A and 23B and the hook surfaces 24A and 24B are formed in a shape obtained by rotating by 180° about the axis of the pulling-out direction D1 of the optical fiber 100. However, these surfaces can be formed in a shape obtained by rotating by any angle (for example, an angle smaller than 180°).

In the coating removal blade 3A exemplified in FIG. 5, the blade tip 21A is formed by linearly extending in one direction orthogonal to the pulling-out direction D1 of the optical fiber 100 (a direction denoted by reference numeral D2 in FIG. 5), similarly to the blade tip 21 of one or more embodiments.

In the coating removal blade 3B shown in FIG. 6, the blade tip 21B is formed in an arc concave shape having the axis of the conical inner surface as the center. In this case, the optical fiber 100 fits into the blade tip 21B having a concave shape such that the blade tip 21B bites into a coating material 101 when the optical fiber 100 is sandwiched between the pair of coating removal blades 3B and 3B.

In the coating removal blades 3A and 3B of one or more embodiments described above, a sectional shape passing through the axis of the conical inner surface can be a shape similar to the shape of the coating removal blade 3 of one or more embodiments exemplified in FIGS. 2 to 4.

The coating removal blades 3A and 3B of one or more embodiments achieve effects similar to those of one or more embodiments described above.

Additionally, in the coating removal blades 3A and 3B of one or more embodiments, the inclined surfaces 23A and 23B are formed on the conical inner surface (the inner surface of the rotating body) having the pulling-out direction D1 of the optical fiber 100 as the axis. Therefore, when the optical fiber 100 is moved in the pulling-out direction D1 in a state where the optical fiber 100 is sandwiched between the pair of coating removal blades 3A and 3A (3B and 3B), a coating material 101A located between the inclined surfaces 23A and 23A (23B and 23B) of the pair of coating removal blades 3A and 3A (3B and 3B) can be pressed in a direction of approaching the center of an optical fiber bare wire 102 in the radial direction of the optical fiber bare wire 102. In other words, the coating material 101A located between the pair of inclined surfaces 23A and 23A (23B and 23B) can be pressed toward the center of the optical fiber bare wire 102 not only from the arrangement direction of the pair of coating removal blades 3A and 3A (3B and 3B) but also from a direction orthogonal to the pulling-out direction D1 of the optical fiber 100 and intersecting the arrangement direction of the pair of coating removal blades 3A and 3A (3B and 3B). Thus, it is possible to more reliably prevent the optical fiber bare wire 102 from approaching one of the blade tips 21A and 21B of the coating removal blades 3A and 3B. That is, it is possible to more reliably prevent the optical fiber bare wire 102 from coming into contact with the blade tips 21A and 21B of the coating removal blades 3A and 3B.

Next, one or more embodiments of the optical fiber coating removal apparatus will be described with reference to FIG. 7, focusing on differences from one or more embodiments described above. Note that the same reference numerals are attached to configurations common to one or more embodiments described above and the description thereof will be omitted.

Figure 7:
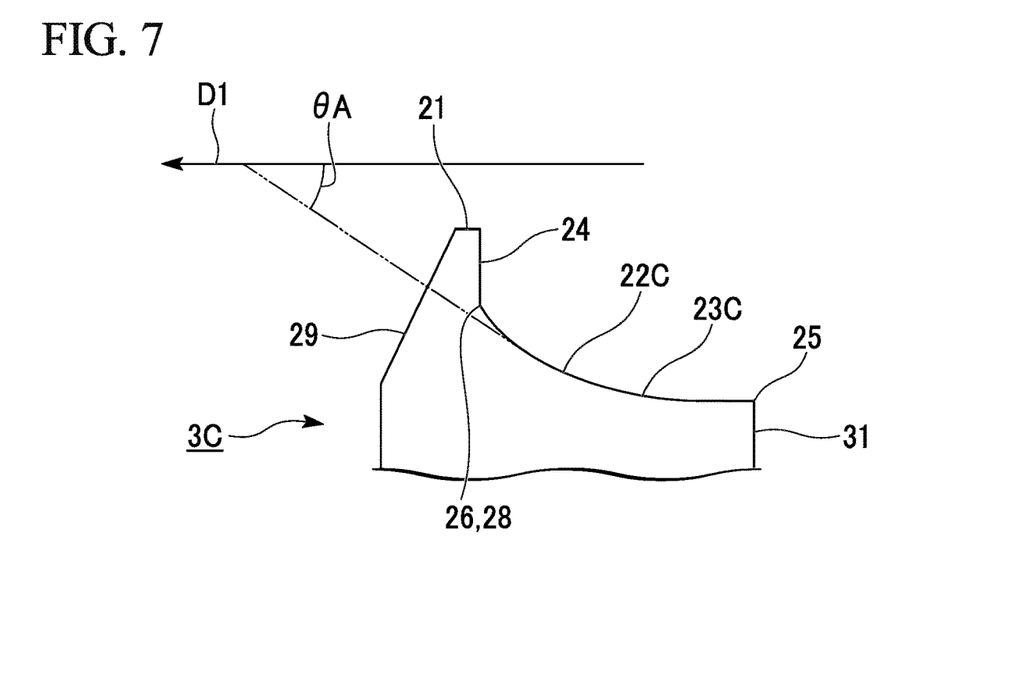
FIG. 7 is a side view showing a coating removal blade according to one or more embodiments of the present invention.

As shown in FIG. 7, a coating removal blade 3C of one or more embodiments has a pressing surface 22C including an inclined surface 23C and a hook surface 24, and a blade tip 21 of one or more embodiments.

However, the inclined surface 23C of one or more embodiments is formed on a surface whose inclination angle changes in an inclined direction thereof. Specifically, the inclined surface 23C is formed in a curved surface shape in which the inclination angle θA of the inclined surface 23C with respect to the pulling-out direction D1 decreases as the distance from the blade tip 21 increases.

The inclined surface 23C as viewed from the direction shown in FIG. 7 may be formed in, for example, a curved shape forming a part of an ellipse as exemplified in FIG. 7, or may be formed in, for example, a curved shape forming a part of a circle.

The inclination angle θA of the inclined surface 23C formed in the curved surface shape may be larger than 0° and equal to or smaller than 60° throughout the entire inclined surface 23C in the inclined direction (a longitudinal direction of a curve in FIG. 7). However, the inclination angle θA is not limited to this. The inclination angle θA of the inclined surface 23C is only required to be larger than 0° and equal to or smaller than 60° at least in a part of the inclined surface 23C in the inclined direction. The inclination angle θA of the inclined surface 23C at a first end 25 of the inclined surface 23C may be 0°, for example. Meanwhile, the inclination angle θA of the inclined surface 23C at a second end 26 of the inclined surface 23C may be larger than 60°, for example.

In one or more embodiments, the inclined surface 23C can be formed on, for example, a surface extending in one direction orthogonal to the pulling-out direction D1 of the optical fiber 100 (a direction orthogonal to the paper surface in FIG. 7), as in the case of one or more embodiments described above. In addition, the inclined surface 23C may be formed on, for example, an inner surface of a spherical body (the inner surface of the rotating body) having the pulling-out direction D1 of the optical fiber 100 as an axis, as in the case of one or more embodiments described above. The inner surface of the spherical body can include an inner surface of an ellipsoid or an inner surface of a sphere.

The coating removal blade 3C of one or more embodiments achieves effects similar to those of one or more embodiments described above.

Next, one or more embodiments of the optical fiber coating removal apparatus will be described with reference to FIG. 8, focusing on differences from one or more embodiments described above. Note that the same reference numerals are attached to configurations common to one or more embodiments described above and a description thereof will be omitted.

Figure 8:
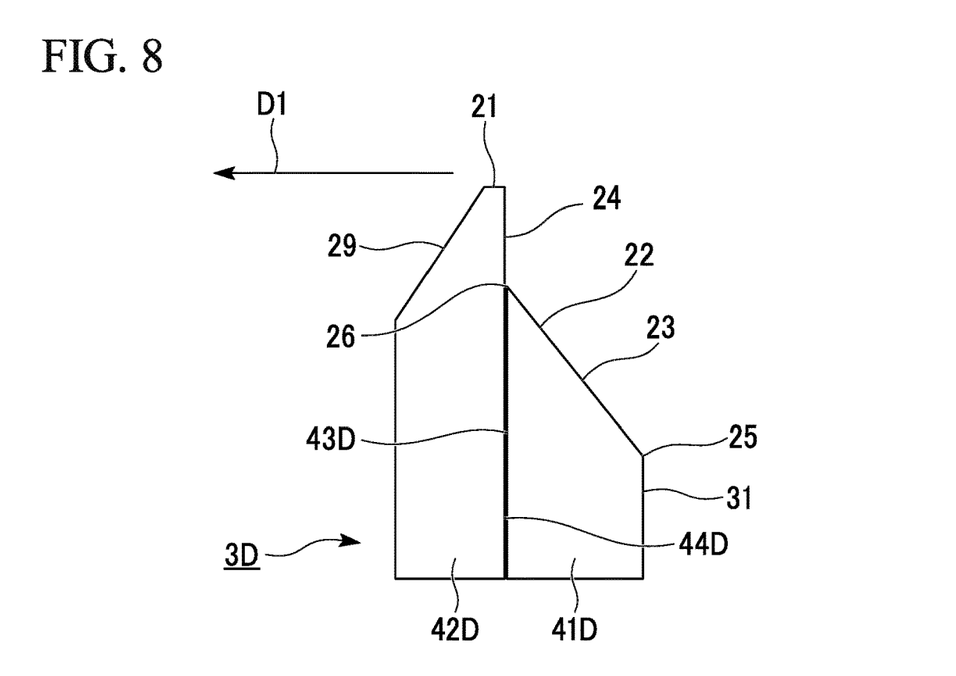
FIG. 8 is a side view showing a coating removal blade according to one or more embodiments of the present invention.

As shown in FIG. 8, a coating removal blade 3D of one or more embodiments has a pressing surface 22 including an inclined surface 23 and a hook surface 24, and a blade tip 21 as in one or more embodiments described above.

However, the coating removal blade 3D of one or more embodiments includes two blade-divided bodies 41D and 42D. The first blade-divided body 41D includes the inclined surface 23 of the pressing surface 22. Meanwhile, the second blade-divided body 42D includes the hook surface 24 of the pressing surface 22 and the blade tip 21. The first blade-divided body 41D and the second blade-divided body 42D are sequentially arranged in the pulling-out direction D1 of an optical fiber 100.

In one or more embodiments, the respective two blade-divided bodies 41D and 42D are formed so as to be in surface contact with each other. In the coating removal blade 3D exemplified in FIG. 8, contact surfaces 43D and 44D of the blade-divided bodies 41D and 42D, respectively, which are in surface contact with each other are orthogonal to the pulling-out direction D1 of the optical fiber 100, but the contact surfaces 43D and 44D are not limited to this.

The contact surfaces 43D and 44D of the two blade-divided bodies 41D and 42D may be formed, for example, flatly but may be formed in, for example, a concavo-convex shape such that the contact surfaces 43D and 44D mesh with each other. In this case, the two blade-divided bodies 41D and 42D can be easily positioned relative to each other.

Additionally, in one or more embodiments, the height dimensions of the two blade-divided bodies 41D and 42D in the radial direction of an optical fiber bare wire 102 (the vertical direction in FIG. 8) are made different from each other. In this case, only by aligning the positions of lower ends (ends opposite to the blade tips 21) of the two blade-divided bodies 41D and 42D, the blade tip 21 and a second end 26 of the inclined surface 23 can be easily positioned relative to each other in the radial direction of the optical fiber bare wire 102.

The coating removal blade 3D of one or more embodiments achieves effects similar to those of one or more embodiments described above.

Furthermore, the coating removal blade 3D of one or more embodiments includes the first blade-divided body 41D including the inclined surface 23, and the second blade-divided body 42D including the hook surface 24 and the blade tip 21. Therefore, by merely replacing one of the two blade-divided bodies 41D and 42D, the relative positional relationship between the inclined surface 23 and the hook surface 24, and the sizes and the inclination angles θA and θB (refer to FIG. 2) of the inclined surface 23 and the hook surface 24 can be adjusted with ease.

In addition, even if a part of the coating removal blade 3D (for example, only in the inclined surface 23, or only in the hook surface 24) is damaged or becomes unusable, either one of the two blade-divided bodies 41D and 42D only needs to be replaced and accordingly, maintenance of the coating removal blade 3D can be easily performed.

Meanwhile, since the shapes of the respective two blade-divided bodies 41D and 42D can be simplified, compared with the shape of the entire coating removal blade 3D, the coating removal blade 3D can be easily manufactured.

The configuration of one or more embodiments described above can also be applied to the coating removal blades 3A, 3B, and 3C.

Next, one or more embodiments of the optical fiber coating removal apparatus will be described with reference to FIGS. 9 and 10, focusing on differences from one or more embodiments described above. Note that the same reference numerals are attached to configurations common to one or more embodiments described above and the description thereof will be omitted.

Figure 9:
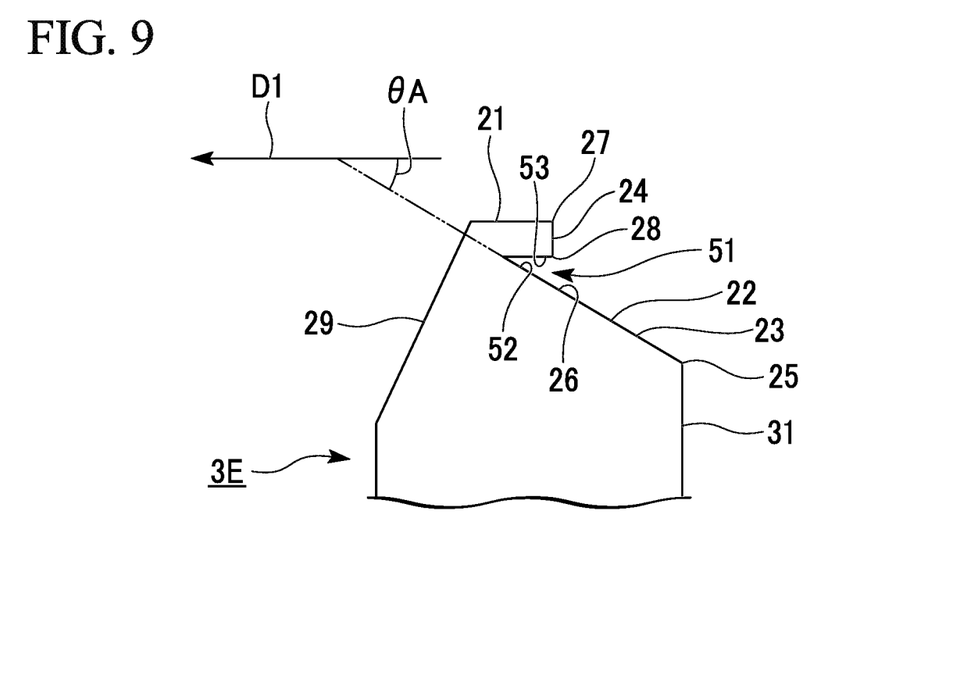
FIG. 9 is a side view showing a first example of a coating removal blade according to one or more embodiments of the present invention.
Figure 10:
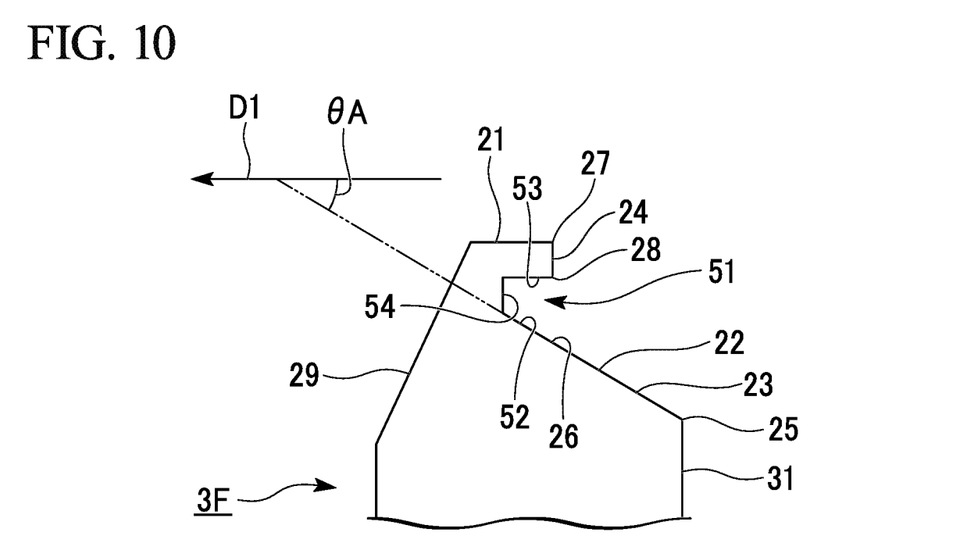
FIG. 10 is a side view showing a second example of the coating removal blade according to one or more embodiments of the present invention.

As shown in FIGS. 9 and 10, each of the coating removal blades 3E and 3F of one or more embodiments has a pressing surface 22 including an inclined surface 23 and a hook surface 24, and a blade tip 21.

However, in each of the coating removal blades 3E and 3F according to one or more embodiments, a recess portion 51 recessed in the pulling-out direction D1 of an optical fiber 100 is formed between the inclined surface 23 and the hook surface 24 of the pressing surface 22.

The shape of an inner surface of the recess portion 51 can be arbitrary.

A first inner side surface 52 connected to a second end 26 of the inclined surface 23 on the inner surface of the recess portion 51 may extend, for example, in the pulling-out direction D1. In addition, as shown in FIGS. 9 and 10 as an example, the first inner side surface 52 may be inclined at the same inclination angle θA as that of the inclined surface 23 and formed to be flush with the inclined surface 23. In other words, for example, the first inner side surface 52 of the recess portion 51 may constitute a part of the inclined surface 23.

A second inner side surface 53 that is connected to a second end 28 of the hook surface 24 on the inner surface of the recess portion 51 and faces the first inner side surface 52 may extend, for example, in the pulling-out direction D1 as shown in FIGS. 9 and 10. In addition, the second inner side surface 53 may be inclined with respect to the pulling-out direction D1 in such a manner that, for example, an interval to the first inner side surface 52 gradually increases toward an opening of the recess portion 51 (the right end of the recess portion 51 in FIGS. 9 and 10) from the bottom of the recess portion 51 (the left end of the recess portion 51 in FIGS. 9 and 10).

The first inner side surface 52 and the second inner side surface 53 of the recess portion 51, for an example, may be connected directly at the bottom of the recess portion 51 as shown in FIG. 9, or alternatively, for example, may be positioned with an interval at the bottom of the recess portion 51 as shown in FIG. 10. The inner surface of the recess portion 51 exemplified in FIG. 10 includes a bottom surface 54 connecting the first inner side surface 52 and the second inner side surface 53 at the bottom of the recess portion 51.

The coating removal blades 3E and 3F of one or more embodiments achieve effects similar to those of one or more embodiments described above.

Additionally, in each of the coating removal blades 3E and 3F of one or more embodiments, the recess portion 51 is formed between the inclined surface 23 and the hook surface 24. Therefore, when the optical fiber 100 is pulled out from a coating material 101A in a state where the optical fiber 100 is sandwiched between the pair of coating removal blades 3E and 3E (3F and 3F), the coating material 101A compressed by the pair of inclined surfaces 23 and 23 in a direction of approaching the center of an optical fiber bare wire 102 is likely to enter the recess portion 51. It is thus possible to more reliably prevent the coating material 101A compressed by the pair of inclined surfaces 23 and 23 from passing through between the pair of coating removal blades 3E and 3E (3F and 3F). That is, it is possible to more reliably prevent the coating material 101A to be removed, from remaining on the optical fiber bare wire 102.

The configuration of one or more embodiments described above can also be applied to the coating removal blades 3A, 3B, 3C, and 3D of any of the above-described embodiments.

Although the disclosure has been described with respect to only a limited number of embodiments, those skilled in the art, having benefit of this disclosure, will appreciated that various other embodiments may be devised without departing from the scope of the present invention. Accordingly, the scope of the invention should be limited only by the attached claims.

Figure 11:
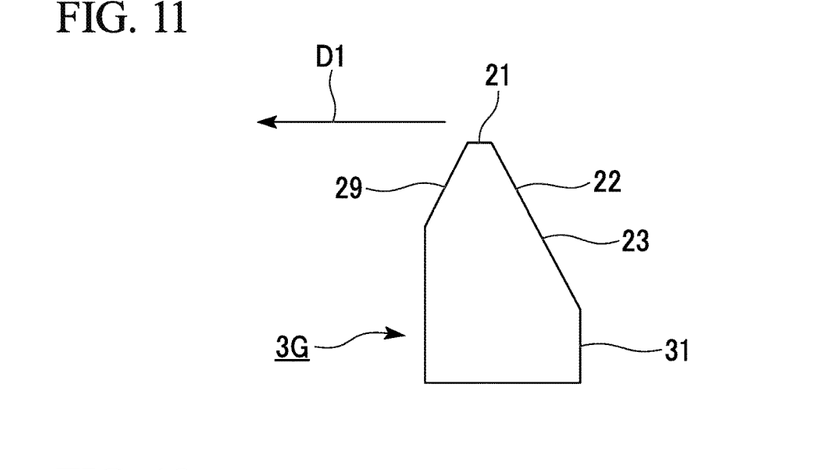
FIG. 11 is a side view showing a coating removal blade according to one or more embodiments of the present invention.
Figure 12:
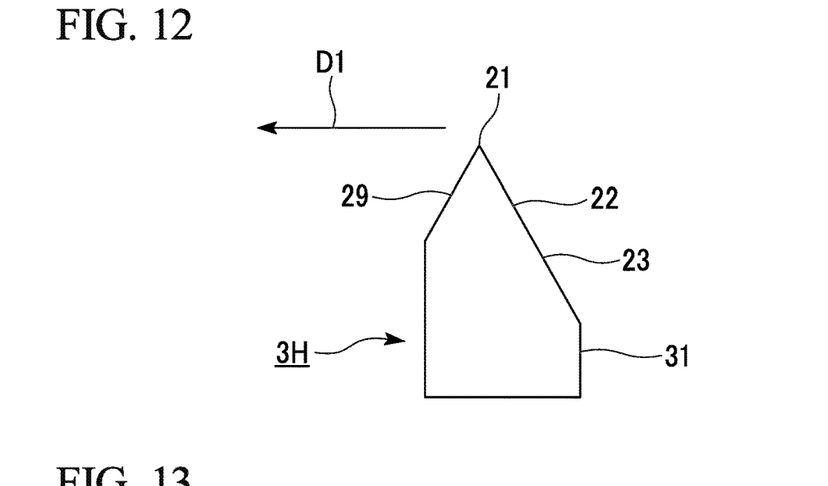
FIG. 12 is a side view showing a coating removal blade according to one or more embodiments of the present invention.
Figure 13:
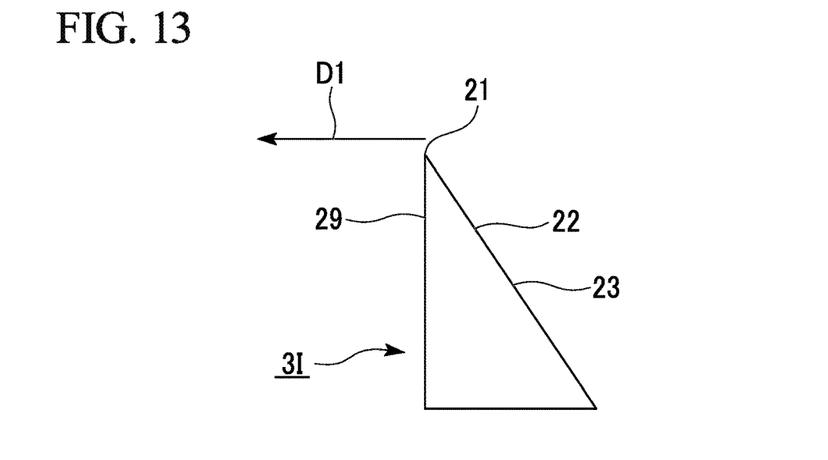
FIG. 13 is a side view showing a coating removal blade according to one or more embodiments of the present invention.

For example, in the coating removal blade, the pressing surface 22 may not include the hook surface 24, as exemplified by coating removal blades 3G, 3H, and 3I shown in FIGS. 10 to 12. That is, the pressing surface 22 is only required to include at least the inclined surface 23.

In addition, in the coating removal blade, the blade tip 21 may be formed in a pointed shape instead of being flat, as exemplified by the coating removal blades 3H and 3I shown in FIGS. 11 and 12.

Furthermore, in the coating removal blade, the opposite surface 29 facing away from the pressing surface 22 may not be inclined as exemplified by the coating removal blade 3I shown in FIG. 12 and may be orthogonal to the pulling-out direction D1 of the optical fiber 100.

DESCRIPTION OF THE REFERENCE SYMBOLS

1: Optical fiber coating removal apparatus
2: Removal blade unit
3, 3A, 3B, 3C, 3D, 3E, 3F, 3G, 3H, 3I: Coating removal blade
21, 21A, 21B: Blade tip
22, 22A, 22B, 22C: Pressing surface
23, 23A, 23B, 23C: Inclined surface
24, 24A, 24B: Hook surface
41D: First blade-divided body
42D: Second blade-divided body 51: Recess portion
100: Optical fiber
101, 101A: Coating material
102: Optical fiber bare wire
D1: Pulling-out direction
θA: Inclination angle of inclined surface

The invention claimed is:

1. A coating removal blade used in an optical fiber coating removal apparatus that removes a coating material of an optical fiber, comprising:
   a blade tip that is pressed against the coating material from a radial direction of an optical fiber bare wire of the optical fiber; and
   a pressing surface against which the coating material to be pulled out from the optical fiber is pressed in a longitudinal direction of the optical fiber, wherein
   the pressing surface includes:
      an inclined surface that is inclined at a constant angle to extend in a direction opposite to a pulling-out direction of the optical fiber as a distance from the blade tip in the radial direction of the optical fiber bare wire increases; and
      a hook surface formed between the inclined surface and the blade tip,
   an inclination angle of the inclined surface with respect to the pulling-out direction of the optical fiber is larger than 0° and equal to or smaller than 60°,
   the hook surface is orthogonal to the pulling-out direction of the optical fiber or inclined to extend in the direction opposite to the pulling-out direction of the optical fiber as a distance to the blade tip from the inclined surface in the radial direction of the optical fiber bare wire decreases, and
   both the hook surface and the inclined surface press against the coating material during removal of the coating material from the optical fiber.

2. The coating removal blade according to claim 1, further comprising a first blade-divided body that includes the inclined surface, and a second blade-divided body that includes the hook surface and the blade tip, wherein the first blade-divided body and the second blade-divided body are sequentially arranged in the pulling-out direction.

3. The coating removal blade according to claim 1, wherein a recess portion recessed in the pulling-out direction is formed between the inclined surface and the hook surface of the pressing surface.

4. The coating removal blade according to claim 1, wherein
   the inclined surface is formed on an inner surface of a rotating body having the pulling-out direction as an axis, and
   an inner diameter of the inner surface of the rotating body increases toward the direction opposite to the pulling-out direction from the blade tip.

5. A removal blade unit comprising a pair of the coating removal blades according to claim 1, wherein the inclined surfaces of the pair of coating removal blades face each other in an arrangement direction of the pair of coating removal blades while the optical fiber is sandwiched between the pair of coating removal blades from the radial direction of the optical fiber bare wire and an interval between the inclined surfaces of the pair of coating removal blades gradually decreases toward the pulling-out direction of the optical fiber.

6. The removal blade unit according to claim 5, wherein the inclination angles of the inclined surfaces of the pair of coating removal blades are equal.

7. An optical fiber coating removal apparatus comprising the removal blade unit according to claim 5.

8. An optical fiber coating removal apparatus comprising the coating removal blade according to claim 1.

* * * * *